(12) United States Patent
Yamauchi et al.

(10) Patent No.: US 9,787,119 B2
(45) Date of Patent: Oct. 10, 2017

(54) ELECTRIC STORAGE DEVICE AND METHOD FOR CHARGING SAME

(71) Applicant: Hitachi Maxell, Ltd., Ibaraki-shi, Osaka (JP)

(72) Inventors: Shin Yamauchi, Tokyo (JP); Kohei Honkura, Tokyo (JP); Hirofumi Takahashi, Tokyo (JP); Takashi Kamijoh, Tokyo (JP); Mitsuhiro Kishimi, Kyoto (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 187 days.

(21) Appl. No.: 14/651,327

(22) PCT Filed: Dec. 14, 2012

(86) PCT No.: PCT/JP2012/082508
§ 371 (c)(1),
(2) Date: Jun. 11, 2015

(87) PCT Pub. No.: WO2014/091622
PCT Pub. Date: Jun. 19, 2014

(65) Prior Publication Data
US 2015/0318717 A1 Nov. 5, 2015

(51) Int. Cl.
*H02J 7/00* (2006.01)
*H01M 10/44* (2006.01)
*H02J 7/04* (2006.01)
*H02J 7/08* (2006.01)
*H01M 10/0525* (2010.01)
*H02J 7/35* (2006.01)

(52) U.S. Cl.
CPC ............. *H02J 7/007* (2013.01); *H01M 10/44* (2013.01); *H02J 7/0052* (2013.01); *H02J 7/045* (2013.01);
(Continued)

(58) Field of Classification Search
CPC ...................................................... H02J 7/007
(Continued)

(56) References Cited

U.S. PATENT DOCUMENTS 8,798,832 B2 * 8/2014 Kawahara ........... H01M 10/441
701/22
8,981,729 B2 * 3/2015 Machida ................... H02J 7/04
320/104
(Continued)

FOREIGN PATENT DOCUMENTS

JP 2001-52760 A 2/2001
JP 2012-16263 A 1/2012
(Continued)

OTHER PUBLICATIONS

International Search Report (PCT/ISA/210) dated Feb. 26, 2013, with English translation (Three (3) pages).
(Continued)

*Primary Examiner* — Samuel Berhanu
*Assistant Examiner* — Tessema Kebede
(74) *Attorney, Agent, or Firm* — Crowell & Moring LLP

(57) ABSTRACT

Provided are: an electric storage device having improved reliability in charging a storage battery; and a charging method. This electric storage device is provided with: an SOC calculation section which calculates a charge rate when a battery voltage reached a predetermined value, in the cases where the battery voltage reached the predetermined value when a lithium ion storage battery is being charged; a voltage difference calculation section, which calculates a battery voltage difference corresponding to a difference between the charge rate and a charge rate at which lithium is deposited; a charge complete voltage calculation means, which calculates a charge complete voltage by adding the voltage difference to the battery voltage obtained when the battery voltage reached the predetermined value; and a charge control means, which completes the charging of the lithium ion storage battery in the cases where the battery voltage reached the charge complete voltage.

5 Claims, 9 Drawing Sheets

(52) U.S. Cl.
CPC ......... *H02J 7/085* (2013.01); *H01M 10/0525* (2013.01); *H01M 10/448* (2013.01); *H02J 7/35* (2013.01); *Y02E 10/766* (2013.01); *Y02E 60/122* (2013.01)

(58) Field of Classification Search
USPC ........................................................ 320/162
See application file for complete search history.

(56) References Cited

U.S. PATENT DOCUMENTS

| | | | | |
|---|---|---|---|---|
| 2009/0104510 | A1* | 4/2009 | Fulop ..................... | H01M 2/30 429/50 |
| 2011/0279088 | A1* | 11/2011 | Yamamoto ........... | H01M 10/44 320/134 |
| 2012/0086368 | A1* | 4/2012 | Kawabuchi ........... | B60L 3/0046 318/139 |
| 2012/0091966 | A1* | 4/2012 | Mori ..................... | H01M 10/44 320/134 |
| 2013/0069584 | A1 | 3/2013 | Nagakura | |

FOREIGN PATENT DOCUMENTS

| | | |
|---|---|---|
| JP | 2012-49040 A | 3/2012 |
| JP | 2012-85452 A | 4/2012 |

OTHER PUBLICATIONS

Japanese language Written Opinion (PCT/ISA/237) ) dated Feb. 26, 2013 (Three (3) pages).

* cited by examiner

FIG. 9A  <COMPARATIVE EXAMPLE>
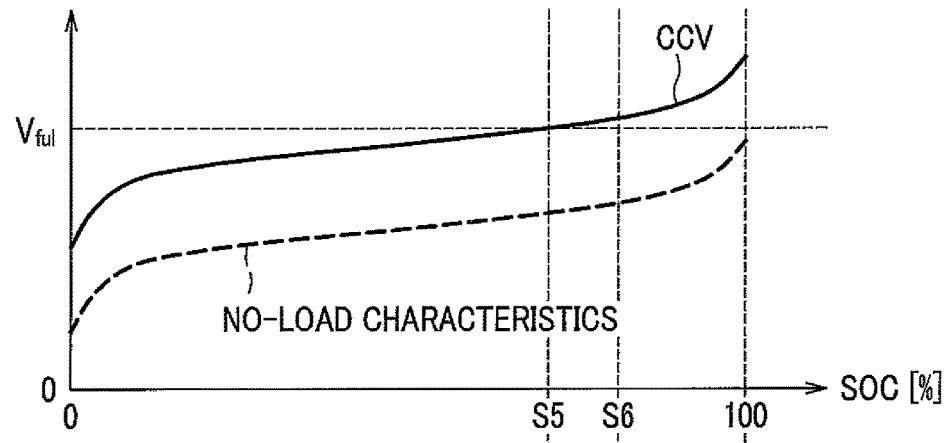
FIG. 9B
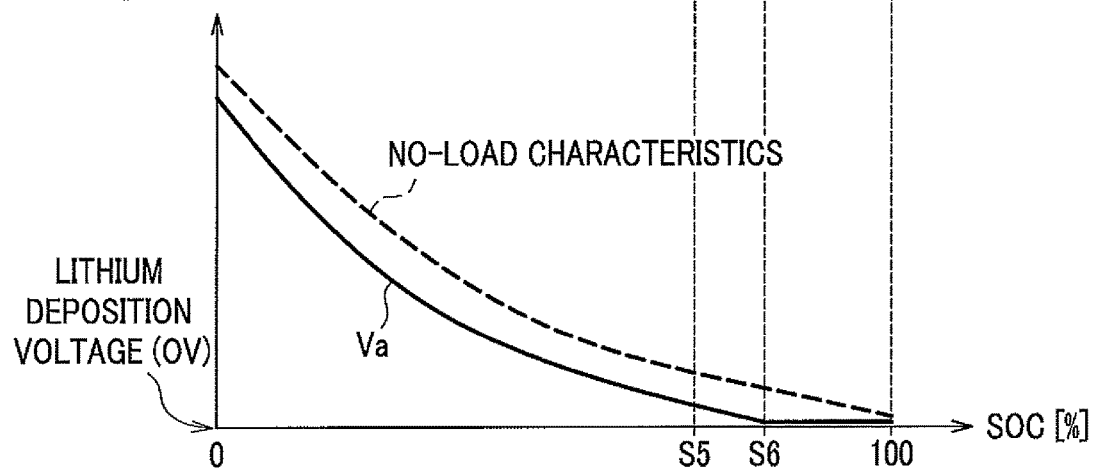
FIG. 9C
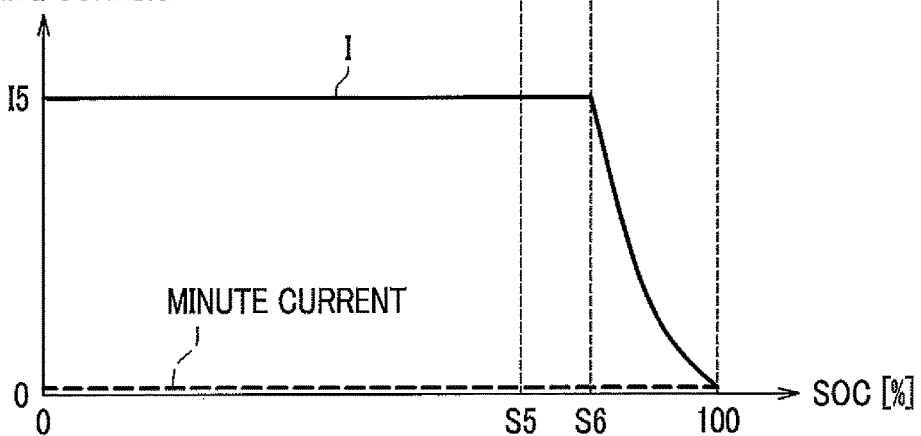

ELECTRIC STORAGE DEVICE AND METHOD FOR CHARGING SAME

TECHNICAL FIELD

The present invention relates to an electric storage device including a storage battery, and a method for charging the same.

BACKGROUND ART

There have recently been active approaches to sustaining and protecting the environment all over the world, leading to increasing introduction of natural energy power generation devices using natural energy, such as wind power generation and solar power generation. Power generated by the natural energy power generation device is likely to undergo frequency fluctuations and voltage fluctuations depending on the weather or the like, and thus may cause trouble to a power system.

As one of the countermeasures against such a problem, there has been proposed a technology to suppress (absorb) the voltage fluctuations and the like by installing an electric storage device in addition to the natural energy power generation device, and thus to stably supply power to the power system. Note that, as the electric storage device described above, there has been known one including a lithium ion storage battery (secondary battery) having high capacity and high output characteristics.

Incidentally, the lithium ion storage battery may suffer performance degradation due to deposition of lithium metal on a negative electrode, when charged in a low-temperature environment or charged with a large current. Therefore, there has heretofore been known a charge control technology to safely perform charge by suppressing deposition of lithium metal.

For example, Patent Literature 1 discloses a charge control device including a negative electrode closed-circuit potential calculation unit configured to calculate a closed-circuit potential of a negative electrode using an open-circuit voltage acquired by an open-circuit voltage acquisition unit; a closed-circuit potential determination unit configured to determine whether or not the calculated negative electrode closed-circuit potential is less than a predetermined threshold; and a charging current control unit configured to reduce a charging current value when the negative electrode closed-circuit potential is less than the threshold.

RELATED ART DOCUMENTS

Patent Literatures

Patent Literature 1: JP 2012-49040 A

SUMMARY OF INVENTION

Problems to be Solved by the Invention

The technology described in Patent Literature 1 is effective for a system capable of instantaneously controlling the charging current, such as a hybrid vehicle and an electric vehicle.

Meanwhile, power generated by wind power generation, for example, is proportional to a wind receiving area of blades of a windmill. Therefore, the wind receiving area needs to be adjusted by controlling an attachment angle (pitch angle) of the blades according to the state of charge (SOC) of the storage battery.

Note that it takes several sec to several ten sec to change the pitch angle of the blades. Specifically, there is a predetermined time lag between the time when a command to change the pitch angle of the blades is outputted from a control unit and the actual change in the pitch angle of the blades. Therefore, in the case of wind power generation using a giant windmill, it is difficult to instantaneously control the charging current by the inertial force of the rotating windmill.

When the technology described in Patent Literature 1 is applied to the wind power generation, charging current control does not make it in time, and the negative electrode voltage may fall below the lithium voltage. Accordingly, lithium metal might be deposited, resulting in performance degradation of the storage battery.

It is an object of the present invention to provide an electric storage device and a charging method, having improved reliability in charging a storage battery.

Means for Solving the Problems

To solve the above problems, the present invention includes: charge rate calculation means for calculating, in the case where a battery voltage of a lithium ion storage battery during charge has reached a predetermined value, a charge rate of a lithium ion storage battery when the battery voltage has reached the predetermined value; voltage difference calculation means for calculating, based on no-load characteristics of the lithium ion storage battery, a battery voltage difference corresponding to a difference between the charge rate calculated by the charge rate calculation means and a preset charge rate during lithium deposition; charge complete voltage calculation means for calculating a charge complete voltage that is a criterion for determining whether or not to complete the charge, by adding the battery voltage difference calculated by the voltage difference calculation means to the battery voltage when the battery voltage has reached the predetermined value; and charge control means for completing the charge of the lithium ion storage battery when the battery voltage of the lithium ion storage battery has reached the charge complete voltage.

Note that details will be described in Description of Embodiments.

Advantages of the Invention

According to the present invention, an electric storage device and a charging method having improved reliability in charging a storage battery can be provided.

BRIEF DESCRIPTION OF THE DRAWINGS

FIG. 9A is a characteristic diagram according to a comparative example, showing SOC-CCV characteristics and no-load characteristics of the storage battery;

FIG. 9B is a characteristic diagram according to the comparative example, showing SOC-negative electrode voltage characteristics of the storage battery; and FIG. 9C is a characteristic diagram according to the comparative example, showing SOC-charging current characteristics.

DESCRIPTION OF PREFERRED EMBODIMENTS

Hereinafter, modes for carrying out the present invention (hereinafter referred to as embodiments) will be described with reference to the accompanying drawings.

First Embodiment

Figure 1:
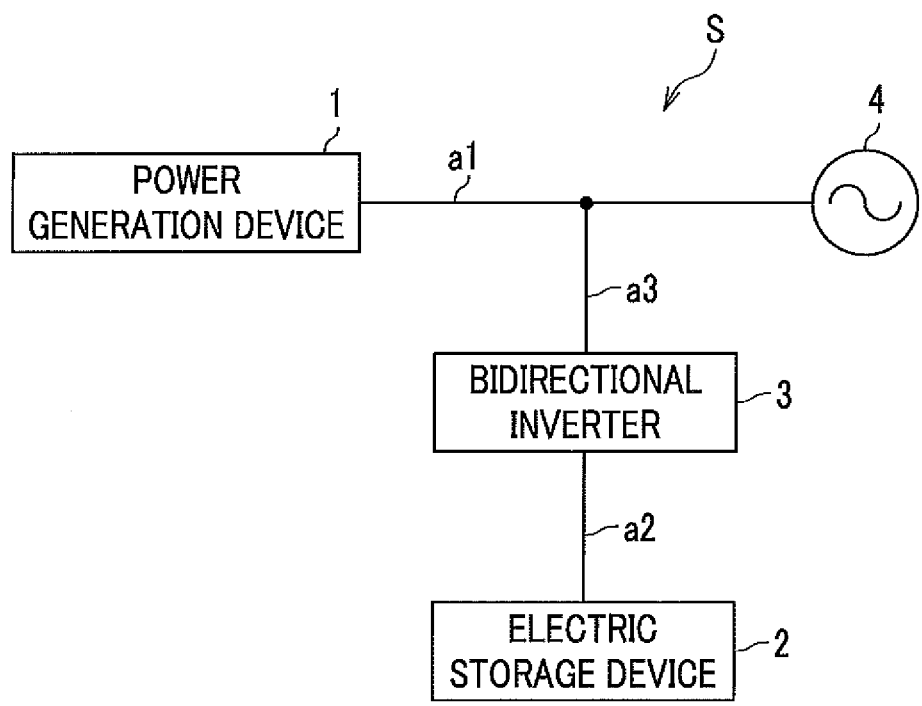
FIG. 1 is an overall configuration diagram showing the overview of an electric power system including an electric storage device according to an embodiment of the present invention.

FIG. 1 is an overall configuration diagram showing the overview of an electric power system including an electric storage device according to this embodiment. An electric power system S includes a power generation device 1, an electric storage device 2 and a bidirectional inverter 3.

The power generation device 1 is a wind power generation device or a solar power generation device, for example, having a function to generate power using natural energy and to supply the generated power to a power system 4 (and the electric storage device 2) through a wiring a1. Note that the power generation device 1 includes: power conversion means (inverter: not shown) for converting the generated power into three-phase AC power having a predetermined frequency; and control means (not shown) for controlling the generated power according to a current change in the power system 4 or the like.

The electric storage device 2 has a function to charge and discharge according to driving of the bidirectional inverter 3. The electric storage device 2 includes battery packs 230 (see FIG. 2) having battery cells 242 (see FIG. 2) connected in series-parallel combination. Here, the battery cells 242 are lithium ion storage batteries, for example.

Hereinafter, series-connected battery cells 242, parallel-connected battery cells 242 or battery cells 242 connected in arbitrary series-parallel combination may be simply described as a "storage battery". Note that the electric storage device 2 will be described in detail later.

The bidirectional inverter 3 is a three-phase bidirectional inverter using an IGBT (Insulated Gate Bipolar Transistor) that is a switching element (not shown), for example, and is connected to the power generation device 1 and the power system 4 through wirings a3 and a1. Note that the bidirectional inverter 3 includes control means (not shown) for controlling on and off of the switching element by PWM control (Pulse Width Modulation).

In the case of charging the storage battery included in the electric storage device 2, the bidirectional inverter 3 converts the three-phase AC power received from the power generation device 1 through the wirings a1 and a3 into DC power, and outputs the DC power to the electric storage device 2 through the wiring a2. In this case, the bidirectional inverter 3 functions as a converter.

In the case of discharging the storage battery included in the electric storage device 2, on the other hand, the bidirectional inverter 3 converts the DC power discharged from the storage battery through the wiring a2 into three-phase AC power, and outputs the three-phase AC power to the power system 4 through the wirings a3 and a1. In this case, the bidirectional inverter 3 functions as an inverter.

Since natural energy is used in wind power generation or solar power generation, as described above, when a natural environment (direction and power of wind, or intensity of solar light) changes, the generated power accordingly varies with time. As shown in FIG. 1, the electric storage device 2 installed in parallel with the power generation device 1 has a function (i.e., a buffer function) to charge the storage battery with an excess of the generated power supplied from the power generation device 1, and to discharge a shortfall in power from the storage battery. Thus, frequency fluctuations and voltage fluctuations in the power generated by the power generation device 1 can be suppressed (absorbed), and stable power supply can be performed to the power system 4.

Figure 2:
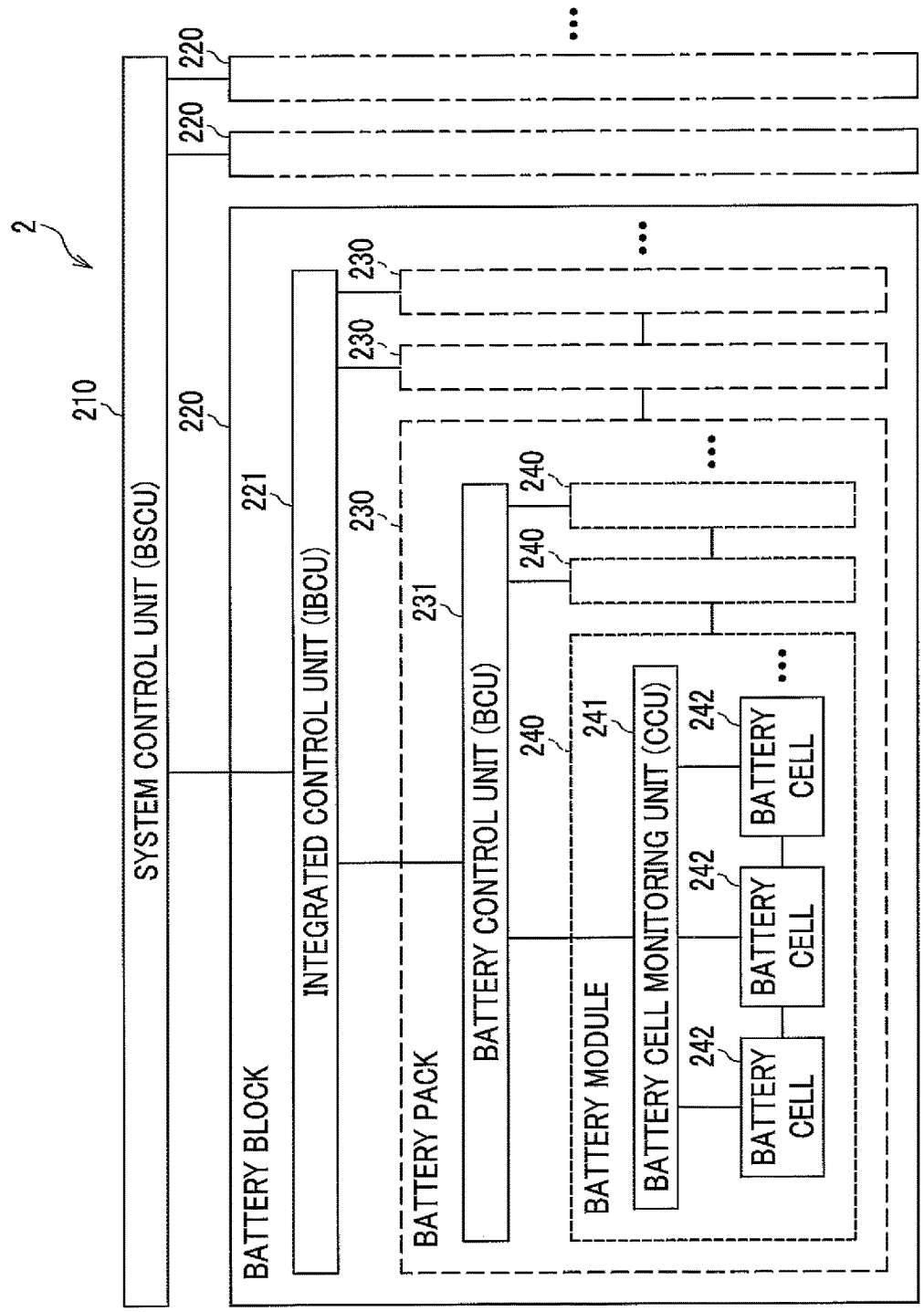
FIG. 2 is a configuration diagram showing a hierarchical structure of the electric storage device.

FIG. 2 is a configuration diagram showing a hierarchical structure of the electric storage device. As shown in FIG. 2, the electric storage device 2 includes battery blocks 220 controlled by a system control unit 210 (BSCU).

Note that the battery blocks 220 are connected in parallel to each other, and are housed in a battery block housing device (not shown) that is a cabinet-type housing. Each of the battery blocks 220 includes parallel-connected battery packs 230 and an integrated control unit 221 (IBCU) configured to control operations of each of the battery packs 230.

Each of the battery packs 230 includes parallel-connected battery modules 240 and a battery control unit 231 (BCU) configured to control operations of each of the battery modules 240. Each of the battery modules 240 includes the battery cells 242 connected in series-parallel combination and a battery cell monitoring unit 241 (CCU) configured to monitor the state of each of the battery cells 242. Each of the battery cells 242 is a secondary battery such as a lithium ion storage battery and a lead storage battery, for example, and is charged and discharged according to driving of the bidirectional inverter 3.

Note that, although the connection between the battery cells 242 is simplified in FIG. 2, the "storage battery" included in the battery module 240 includes series-connected battery cells 242, parallel-connected battery cells 242 and the battery cells 242 connected in arbitrary series-parallel combination The battery cell monitoring unit 241 has a function to generate information about a state of charge (charge rate, SOC: State Of Charge) by measuring a voltage between the terminals, temperature and current for each of the battery cells 242. The battery cell monitoring unit 241 also has a function to monitor and control the state of each of the battery cells 242 connected thereto, and to output SOC information and the like to the battery control unit 231 in the upper level through a wiring b1.

The battery control unit 231 has a function to output the SOC information on the battery cells 242 inputted from the battery cell monitoring unit 241 and management information on the battery packs 230 to the integrated control unit 221 in the upper level through a wiring b2. The integrated control unit 221 has a function to output the information inputted from the battery control unit 231 and management information on the battery blocks 220 to the system control unit 210 in the upper level through a wiring b3. The system control unit 210 has a function to perform integrated management of operations of the battery blocks 220.

As described above, the electric storage device 2 hierarchically manages the states of the many battery cells 242, thereby making processing by each of the control units more efficient and reducing processing load thereof.

<Charge Control by Electric Storage Device>

Incidentally, as for the lithium ion storage battery, a negative electrode voltage is reduced as charge thereof progresses. Then, when the negative electrode voltage falls below a predetermined lithium deposition voltage, lithium metal is deposited, which may lead to performance degradation of the storage battery. Hereinafter, description is given of charge control for preventing such performance degradation of the storage battery (i.e., lithium metal deposition in a negative electrode). Note that, as to processing in discharging from the storage battery, description thereof will be omitted.

Figure 3:
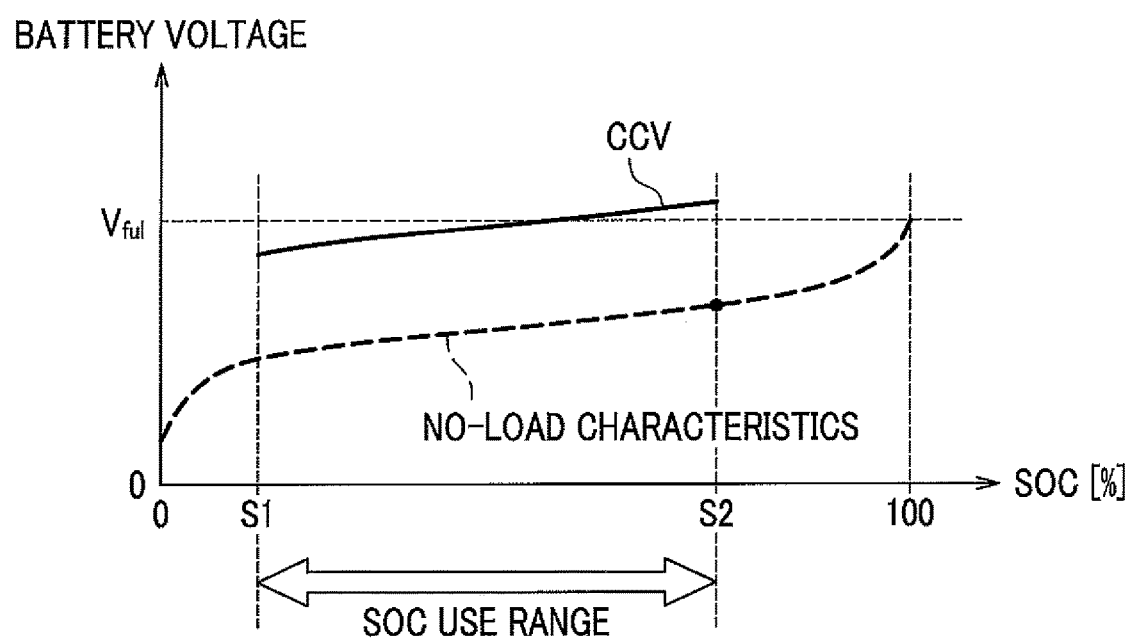
FIG. 3 is a characteristic diagram showing a SOC use range and no-load characteristics used in this embodiment among CCV characteristics of the electric storage device.

FIG. 3 is a characteristic diagram showing a SOC use range and no-load characteristics used in this embodiment among CCV (Closed Circuit Voltage) characteristics of the electric storage device. The horizontal axis in the characteristic diagram shown in FIG. 3 represents the state of charge (SOC) of the storage battery, while the vertical axis represents a battery voltage of the storage battery.

The no-load characteristics indicated by the broken line in FIG. 3 mean SOC-battery voltage characteristics (a profile of the battery voltage in charging with a minute current close to zero) in a state where no load is applied between a positive electrode and a negative electrode of the storage battery. Also, a full charge equivalent voltage $V_{ful}$ is a voltage indicating that the charge rate (SOC) of the storage battery has reached 100% in the no-load characteristics. Note that, for the charge of the storage battery, constant current-constant voltage (CCCV) charge is performed, for example.

In the no-load characteristics (broken line), when the storage battery is charged from the state of charge rate (SOC) 0%, a positive electrode potential is increased and a negative electrode potential is reduced as the charge progresses. Therefore, the battery voltage that is a voltage between the positive and negative electrodes of the storage battery is increased as the charge progresses (the SOC value is increased).

Note that the full charge equivalent voltage $V_{ful}$ shown in FIG. 3 is a battery voltage at which the charge amount of the storage battery reaches its maximum (SOC: 100%) in the no-load characteristics.

The characteristics indicated by the solid line in FIG. 3 are SOC-CCV characteristics in the case where charge is performed by applying a load between the positive and negative electrodes of the storage battery. In general, the storage battery has a predetermined internal resistance. Therefore, in the case of charging the lithium ion storage battery, the battery voltage CCV shows characteristics obtained by adding IR corresponding to the product of a current value I (not shown) and an internal resistance R (not shown) of the battery to the no-load characteristics (FIG. 3: see the solid line).

Note that, when the power generation device 1 (see FIG. 1) is the wind power generation device, it is demanded to continue its operation for a long period of time by extending the life of the storage battery. Therefore, as shown in FIG. 3, the storage battery is charged and discharged within a range where the SOC is not less than a lower limit threshold S1 (>0%) and not more than an upper limit threshold S2 (<100%) (SOC use range). Incidentally, the smaller the value of |S2−S1|, the longer the life of the storage battery can be extended.

The values of the lower limit threshold S1 and the upper limit threshold S2 described above are appropriately set according to the kind and the like of the power generation device 1.

Figure 4A:
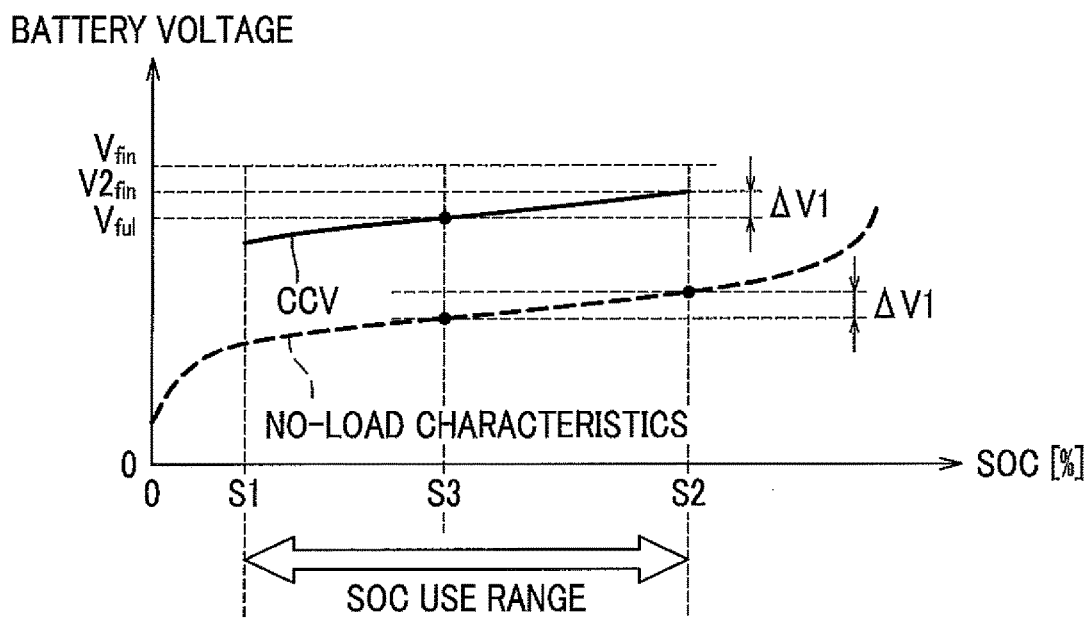
FIG. 4A is a characteristic diagram showing SOC-CCV characteristics and no-load characteristics of the electric storage device.

FIG. 4A is a characteristic diagram showing CCV characteristics and no-load characteristics of the electric storage device.

The CCV characteristics (solid line) and the no-load characteristics (broken line) shown in FIG. 4A are the same as those described with reference to FIG. 3. Note that the vertical axis of FIG. 4A represents the full charge equivalent voltage $V_{ful}$ described above and a maximum allowable voltage $V_{fin}$. Note that the maximum allowable voltage $V_{fin}$ is an upper limit voltage that is allowed to make the storage battery normally function, and is preset according to the specifications of the storage battery. Meanwhile, the full charge equivalent voltage Vful of the storage battery is set based on an experiment conducted beforehand or the like, and is stored beforehand in storage means 22 (see FIG. 5).

As described above, in this embodiment, a control unit 20 (see FIG. 5) performs charge and discharge control so that the SOC of the storage battery is within the range of not less than the lower limit threshold S1 and not more than the upper limit threshold S2.

Figure 4B:
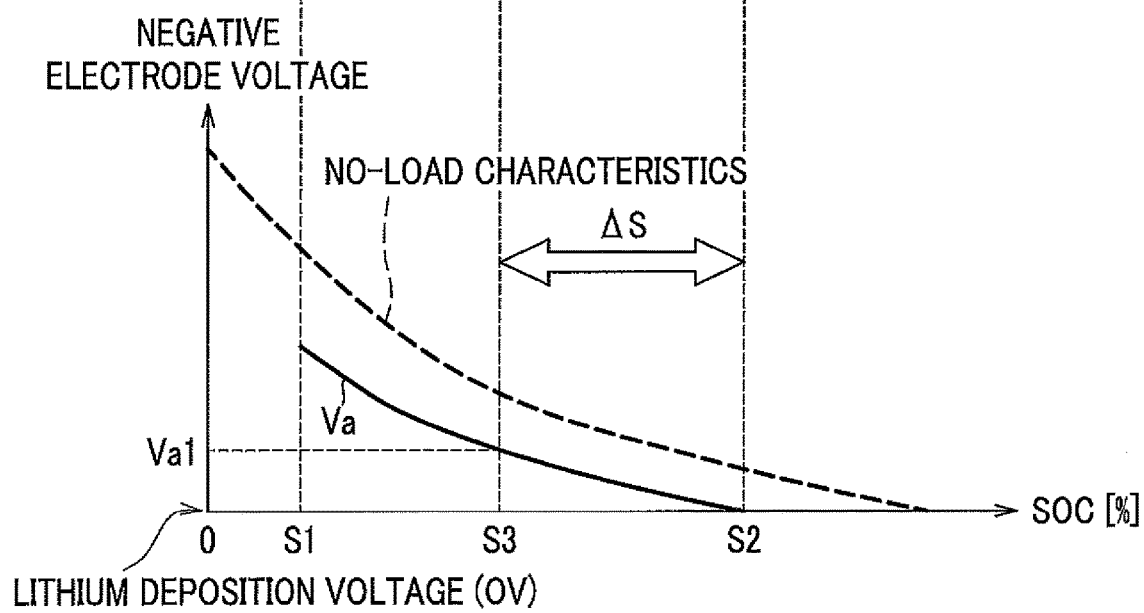
FIG. 4B is a characteristic diagram showing negative electrode voltage characteristics and no-load characteristics of a storage battery.

FIG. 4B is a characteristic diagram showing negative electrode voltage characteristics and no-load characteristics of the storage battery.

The horizontal axis in the characteristic diagram shown in FIG. 4B represents the SOC of the storage battery, while the vertical axis represents a negative electrode voltage of the storage battery. Note that, as for the negative electrode voltage, a voltage at which lithium metal starts to be deposited from a negative electrode is set as a reference (0 V). As shown in FIG. 4B, the negative electrode voltage (solid line) of the storage battery is gradually reduced as the charge progresses. Such behavior is the same for the no-load characteristics (broken line) of the storage battery.

Incidentally, when the negative electrode voltage of the storage battery falls below a lithium deposition voltage, lithium metal starts to be deposited, resulting in performance degradation of the storage battery. Therefore, the negative electrode voltage of the storage battery needs to be maintained always higher than the lithium deposition voltage (0 V).

Note that the negative electrode voltage characteristics (solid line) shown in FIG. 4B are characteristics obtained when a charging current of the storage battery is fixed at a predetermined value, and change with the charging current of the storage battery.

As shown in FIG. 4B, in this embodiment, description is given as an example of the case where the upper limit threshold S2 in the SOC use range is set so that the negative electrode voltage corresponds to 0 V (lithium deposition voltage).

Other than the above, a charge complete voltage $V2_{fin}$ and a voltage difference $\Delta V1$ shown in FIG. 4A and a negative electrode voltage Va1, an amount of change $\Delta S$ and the like shown in FIG. 4B will be described later with flowcharts shown in FIGS. 6 and 7.

Figure 5:
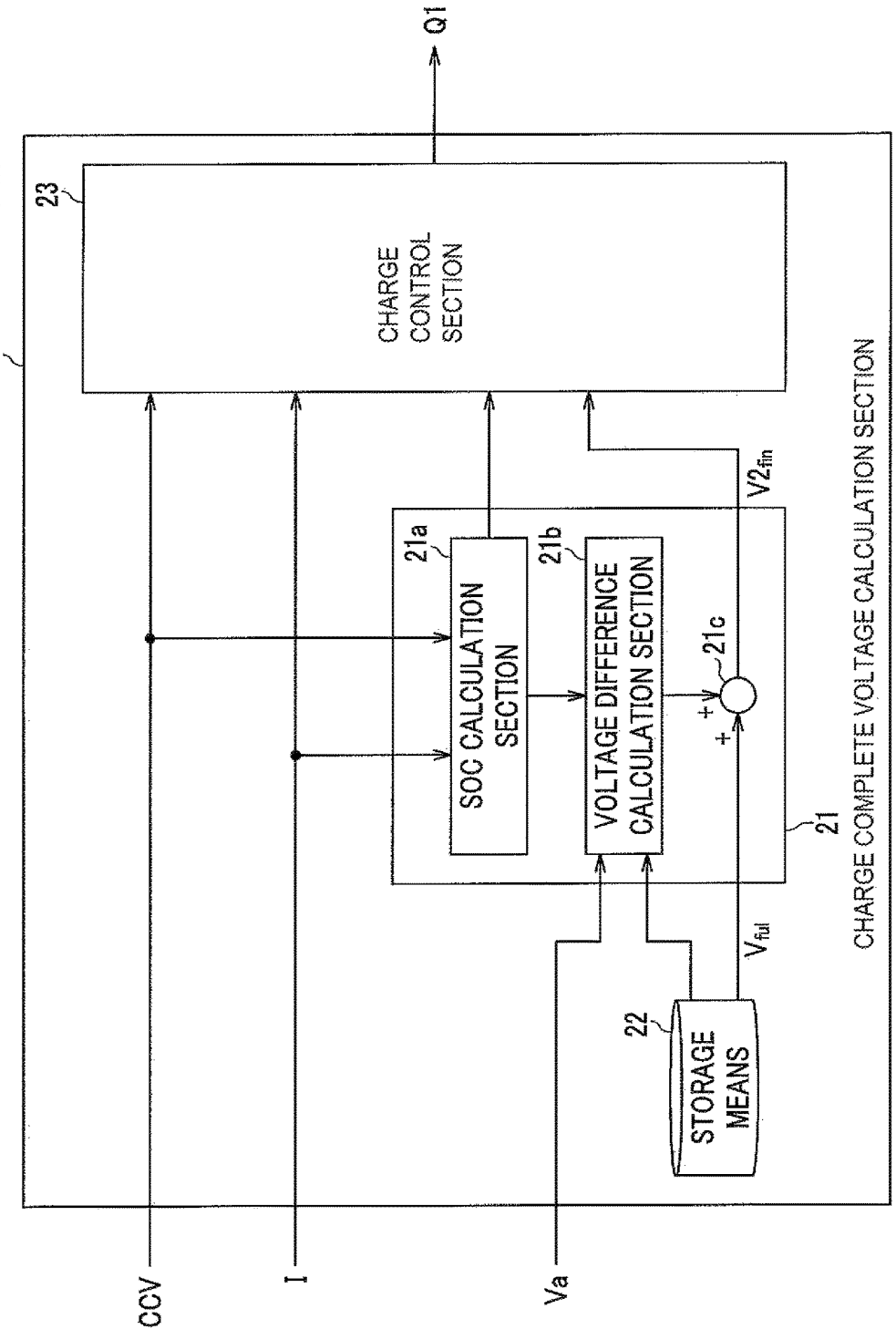
FIG. 5 is a configuration diagram of a control unit included in the electric storage device.

FIG. 5 is a configuration diagram of a control unit included in the electric storage device. Note that a control unit 20 corresponds to the battery cell monitoring unit 241, the battery control unit 231, the integrated control unit 221 and the like shown in FIG. 2, for example. As shown in FIG. 5, the control unit 20 includes charge complete voltage calculation means 21, storage means 22 and charge control means 23.

The charge complete voltage calculation means 21 calculates a charge complete voltage based on the battery voltage CCV, the charging current I and the negative electrode voltage Va. Here, the charge complete voltage is a battery voltage to be a criterion for determining whether or not to complete the charge of the storage battery.

Incidentally, in the wind power generation, the value of the charging current I varies from hour to hour according to the wind power. Therefore, the control unit 20 is configured to perform preprocessing such as filtering processing and averaging processing to be executed every predetermined period of time, thereby handling the value of the charging current I in the predetermined period of time as a constant value (e.g., an average value).

The charge complete voltage calculation means 21 includes an SOC calculation section 21a, a voltage difference calculation section 21b and an adder 21c.

The SOC calculation section 21a (charge rate calculation means) calculates the SOC of the storage battery when the battery voltage CCV has reached the full charge voltage $V_{ful}$, in the case where the battery voltage CCV has reached the full charge voltage $V_{ful}$ when the storage battery is being charged. Note that the battery voltage CCV that is a value detected by a voltage sensor (not shown) installed in the storage battery and the charging current I that is a value detected by a current sensor (not shown) are inputted to the SOC calculation section 21a.

For example, the SOC calculation section 21a calculates the SOC of the storage battery based on the battery voltage CCV of the storage battery and a charging current average value that is a value obtained by averaging the charging currents I of the storage battery every predetermined period of time. Besides the above, various heretofore known methods can be used for the calculation of the SOC.

The voltage difference calculation section 21b (charge difference calculation means) calculates a voltage difference $\Delta V1$ based on the battery voltage CCV, the charging current I, the negative electrode voltage Va and the SOC calculated by the SOC calculation section 21a. Note that the value of the voltage difference $\Delta V1$ is used by the adder 21c when calculating the charge complete voltage $V2_{fin}$.

In calculating the voltage difference $\Delta V1$, the voltage difference calculation section 21b also uses information stored in the storage means 22, such as the no-load characteristics (the broken line in FIG. 4A: battery voltage and the broken line in FIG. 4B: negative electrode voltage) of the storage battery, the full charge equivalent voltage $V_{ful}$ and the maximum allowable voltage $V_{fin}$. The processing of calculating the voltage difference $\Delta V1$ will be described later.

The adder 21c adds the voltage difference $\Delta V1$ inputted from the voltage difference calculation section 21b to the full charge equivalent voltage $V_{ful}$, and outputs the resultant value as the charge complete voltage $V2_{fin}$ to the charge control means 23.

The charge control means 23 controls the charge of the storage battery based on the battery voltage CCV, the charging current I, the SOC inputted from the SOC calculation section 21a and the charge complete voltage $V2_{fin}$ inputted from the adder 21c. Note that a charge complete command Q1 shown in FIG. 5 is a signal to be outputted from the charge control means 23 when completing the charge of the storage battery. The charge control means 23 completes the charge of the storage battery by outputting the charge complete command Q1 and thereby switching a switch (not shown) from on to off, the switch electrically connecting the storage battery to the bidirectional inverter 3 (see FIG. 1).

Figure 6:
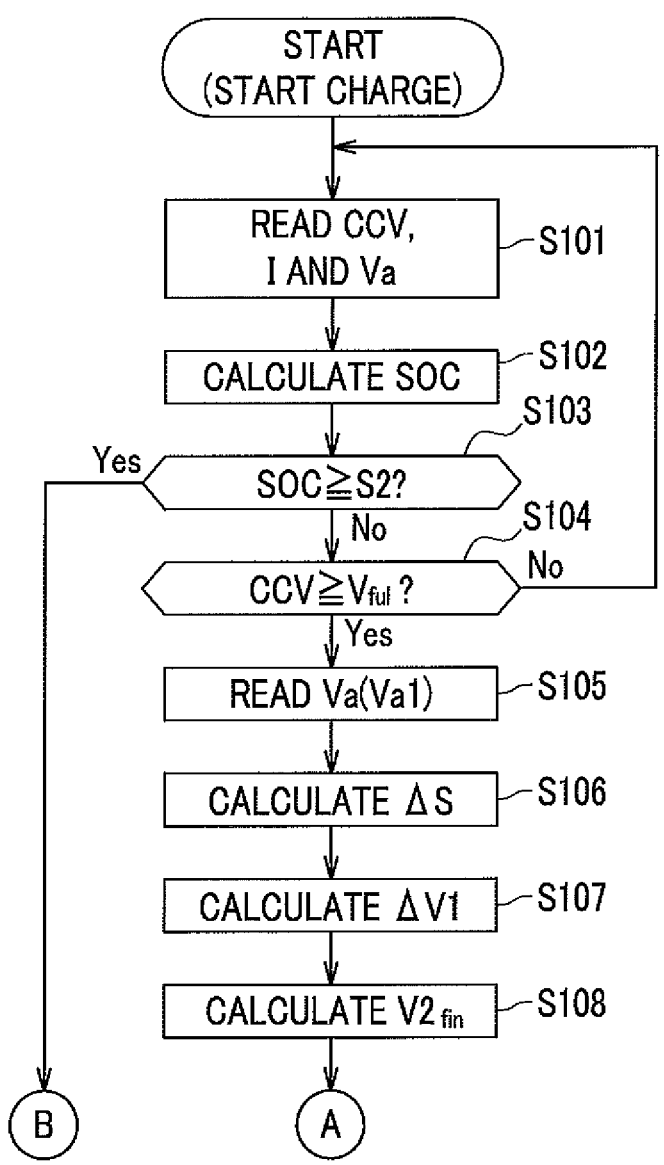
FIG. 6 is a flowchart showing the flow of processing executed by the control unit.

FIG. 6 is a flowchart showing the flow of processing executed by the control unit.

At "START" shown in FIG. 6, the control unit 20 starts charge. Note that, at this point, the SOC (charge rate) of the storage battery is assumed to be within the SOC use range of not less than the lower limit threshold S1 and not more than the upper limit threshold S2 (see FIG. 4A).

In Step S101, the control unit 20 reads the values of the battery voltage CCV, the charging current I and the negative electrode voltage Va of the storage battery described above.

In Step S102, the control unit 20 calculates the SOC of the storage battery based on the battery voltage CCV and the charging current I read in Step S101 (charge rate calculation processing).

In Step S103, the control unit 20 determines whether or not the SOC calculated in Step S102 is not less than the upper limit threshold S2 (i.e., a charge rate during lithium deposition) corresponding to the lithium deposition voltage. Note that the value of the upper limit threshold S2 (see FIG. 4B) corresponding to the lithium deposition voltage is obtained by an experiment conducted beforehand or the like, and is stored in the storage means 22 (see FIG. 5).

When the SOC is not less than the upper limit threshold S2 (Yes in S103), the control unit 20 completes the charge by cutting off the electrical connection between the power system 4 (see FIG. 1) and the storage battery (END). Thus, the negative electrode voltage of the storage battery can be prevented from falling below the lithium deposition voltage, and degradation of the storage battery can be suppressed. On the other hand, when the SOC is less than the upper limit threshold S2 (No in S103), the processing by the control unit 20 advances to Step S104.

In Step S104, the control unit 20 determines whether or not the battery voltage CCV is not less than the full charge equivalent voltage $V_{ful}$. As described above, the value of the full charge equivalent voltage $V_{ful}$ is also preset and stored in the storage means 22 (see FIG. 5).

When the battery voltage CCV is not less than the full charge equivalent voltage $V_{ful}$ (Yes in S104), the processing by the control unit 20 advances to Step S105. Note that, since the battery voltage CCV is less than the maximum allowable voltage $V_{fin}$ ($>V_{ful}$: see FIG. 4A) at this point, there is room for further charge within a range where lithium metal is not deposited. On the other hand, when the battery voltage CCV is less than the full charge equivalent voltage $V_{ful}$ (No in S104), the processing by the control unit 20 returns to Step S101.

As described above, the control unit 20 monitors every predetermined cycle time whether or not the battery voltage CCV has reached the full charge equivalent voltage $V_{ful}$ ($<V_{fin}$) during the charge of the storage battery, and continues the charge when the battery voltage CCV does not reach the full charge equivalent voltage $V_{ful}$.

In Step S105, the control unit 20 reads the negative electrode voltage Va when the battery voltage CCV has reached the full charge equivalent voltage $V_{ful}$ during the charge. The negative electrode voltage Va corresponds to the negative electrode voltage Va1 shown in FIG. 4B.

In Step S106, the control unit 20 calculates an amount of change ΔS (see FIG. 4B) in SOC before the negative electrode voltage Va of the storage battery is reduced by the voltage Va1 from the current point to the lithium deposition voltage (0 V). Note that the amount of change ΔS is obtained by subtracting the SOC value (S3: see FIG. 4B) calculated immediately before the processing in Step S105 from the upper limit threshold S2 corresponding to the lithium deposition voltage (0 V).

In other words, the control unit 20 calculates the SOC (i.e., S3: see FIG. 4B) of the storage battery when the battery voltage CCV has reached the full charge equivalent voltage $V_{ful}$, and then calculates a difference ΔS between the SOC and the preset upper limit threshold S2 (charge rate during lithium deposition).

In Step S107, the control unit 20 calculates, based on the no-load characteristics, an increase ΔV1 (see FIG. 4A) in the battery voltage CCV when the SOC of the storage battery is increased from the predetermined value S3 to the upper limit threshold S2 (voltage difference calculation processing).

The no-load characteristics described above are the SOC-battery voltage characteristics (broken line) shown in FIG. 4A and the SOC-negative electrode voltage characteristics (broken line) shown in FIG. 4B, and are stored beforehand in the storage means 22 (not shown).

As shown in FIG. 4A, the no-load characteristics (broken line) of the storage battery are translated for a voltage drop due to the internal resistance to obtain load characteristics (solid line). Therefore, the voltage increase ΔV1 calculated using the no-load characteristics approximately coincides with a voltage increase ΔV1 when actual charge is performed (see FIG. 4A).

As described above, the control unit 20 calculates, based on the no-load characteristics of the storage battery, the battery voltage difference ΔV1 corresponding to the difference ΔS between the preset upper limit threshold S2 (charge rate during lithium deposition) and the SOC (S3) when the battery voltage CCV has reached the full charge equivalent voltage $V_{ful}$.

In Step S108, the control unit 20 calculates a charge complete voltage $V2_{fin}$ (charge complete voltage calculation processing). The charge complete voltage $V2_{fin}$ is calculated by adding the increase ΔV1 calculated in Step S107 to the full charge equivalent voltage $V_{ful}$ stored in the storage means 22 (see FIG. 5).

In Step S109, the control unit 20 determines whether or not the charge complete voltage $V2_{fin}$ is not less than the maximum allowable voltage $V_{fin}$. When the charge complete voltage $V2_{fin}$ is not less than the maximum allowable voltage $V_{fin}$ (Yes in S109), the processing by the control unit 20 advances to Step S110.

In Step S110, the control unit 20 replaces the charge complete voltage $V2_{fin}$ with the value of the maximum allowable voltage $V_{fin}$. In other words, the control unit 20 resets the maximum allowable voltage $V_{fin}$ preset according to the specifications of the storage battery, as a new charge complete voltage $V2_{fin}$.

On the other hand, when the charge complete voltage $V2_{fin}$ is less than the maximum allowable voltage $V_{fin}$ (No in S109), the processing by the control unit 20 advances to Step S111.

In other words, the control unit 20 resets the smaller one between the charge complete voltage $V2_{fin}$ and the maximum allowable voltage $V_{fin}$ as the new charge complete voltage $V2_{fin}$.

In Step S111, the control unit 20 reads the values of the battery voltage CCV, the charging current I and the negative electrode voltage Va of the storage battery.

In Step S112, the control unit 20 calculates the SOC of the storage battery based on the battery voltage CCV and the charging current I read in Step S111.

In Step S113, the control unit 20 determines whether or not the SOC calculated in Step S112 is not less than the upper limit threshold S2 corresponding to the lithium deposition voltage. When the SOC is not less than the upper limit threshold S2 (Yes in S113), the control unit 20 completes the charge (END). On the other hand, when the SOC is less than the upper limit threshold S2 (No in S113), the processing by the control unit 20 advances to Step S114.

In Step S114, the control unit 20 determines whether or not the battery voltage CCV is not less than the charge complete voltage $V2_{fin}$. Note that the control unit 20 uses the value of the charge complete voltage $V2_{fin}$ reset by the processing in Steps S109 and S110, when performing comparison processing in Step S112.

When the battery voltage CCV is not less than the charge complete voltage $V2_{fin}$ (Yes in S114), the control unit 20 completes the charge of the storage battery (charge control processing: END). On the other hand, when the battery voltage CCV is less than the charge complete voltage $V2_{fin}$ (No in S114), the processing by the control unit 20 returns to Step S111.

In other words, the control unit 20 stops the charge of the storage battery at the earlier timing between a timing when the battery voltage CCV reaches the maximum allowable voltage $V_{fin}$ and a timing when the negative electrode voltage of the storage battery reaches the lithium deposition voltage (0 V).

Such processing can prevent the negative electrode voltage Va of the storage battery from falling below the lithium deposition voltage (0 V) and can also prevent the battery voltage CCV of the storage battery from exceeding the maximum allowable voltage $V_{fin}$.

Figure 8A:
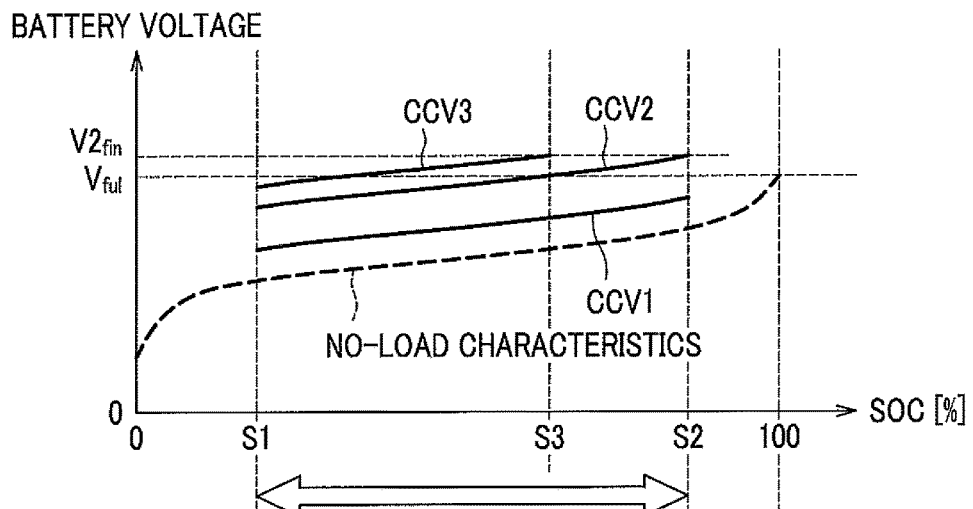
FIG. 8A is a characteristic diagram showing SOC-CCV characteristics and no-load characteristics of the storage battery.
Figure 8B:
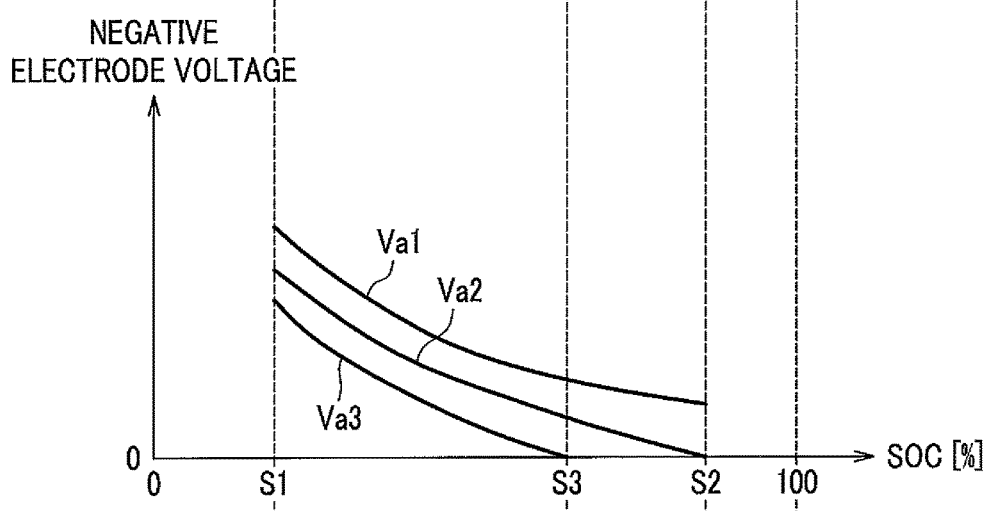
FIG. 8B is a characteristic diagram showing SOC-negative electrode voltage characteristics of the storage battery.
Figure 8C:
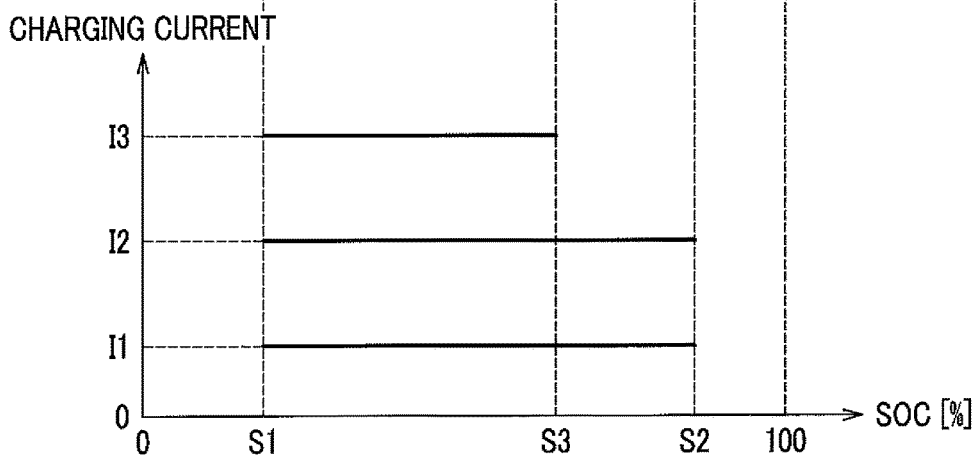
FIG. 8C is a characteristic diagram showing SOC-charging current characteristics.

FIG. 8A is an explanatory diagram showing SOC-CCV characteristics and no-load characteristics of the storage battery, FIG. 8B is an explanatory diagram showing SOC-negative electrode voltage characteristics of the storage battery, and FIG. 8C is an explanatory diagram showing SOC-charging current characteristics. Note that a battery voltage CCV1 shown in FIG. 8A, a negative electrode voltage Va1 shown in FIG. 8B and a charging current I1 shown in FIG. 8C correspond to each other. The same goes for the other battery voltages, negative electrode voltages and charging currents.

Also, a range of not less than the lower limit threshold S1 and not more than the upper limit threshold S2 is set as the SOC use range of the storage battery, and CCCV charge is performed with each of the current values of the charging currents I1, I2 and I3 (I1<I2<I3) as shown in FIG. 8C.

As described above, the larger the value of the charging current, the larger the voltage drop due to the internal resistance. Therefore, in the case of the relatively small charging current I1, the battery voltage CCV1 (see FIG. 8A) is lower than the other battery voltages CCV2 and CCV3, and the negative electrode voltage Va1 (see FIG. 8B) is higher than the other negative electrode voltages Va2 and Va3.

In the case of charge using the charging current I1 (see FIG. 8C), the charge progresses without the battery voltage CCV1 reaching the full charge equivalent voltage $V_{ful}$ within the SOC use range as shown in FIG. 8A (No in S104: see FIG. 6). Then, the control unit 20 completes the charge when the SOC of the storage battery has reached the upper limit threshold S2 (Yes in S103, END). In this event, as shown in FIG. 8B, the value of the negative electrode voltage Va1 has a predetermined allowance for the lithium deposition voltage (0 V).

In the case of charge using the charging current I2 (see FIG. 8C), the control unit 20 calculates a charge complete voltage $V2_{fin}$ when the battery voltage CCV2 has reached the full charge equivalent voltage $V_{ful}$ as shown in FIG. 8A (S108 and S110), and monitors the battery voltage CCV every predetermined cycle time (S114). Then, the control unit 20 completes the charge when the battery voltage CCV has reached the charge complete voltage $V2_{fin}$ (Yes in S114, END). In this event, the charge is completed in a state where the negative electrode voltage Va2 is equal to the lithium deposition voltage (0 V) as shown in FIG. 8B.

In the case of charge using the charging current I3 (see FIG. 8C), the control unit 20 calculates a charge complete voltage $V2_{fin}$ when the battery voltage CCV3 has reached the full charge equivalent voltage $V_{ful}$ as shown in FIG. 8A (S108 and S110). Since the charging current I3 has a relatively large value, the battery voltage CCV reaches the charge complete voltage $V2_{fin}$ before the SOC of the storage battery reaches the upper limit threshold S2, and the charge is completed (Yes in S114, END). In this event, as shown in FIG. 8B, the negative electrode voltage Va2 is equal to the lithium deposition voltage (0 V), and the SOC of the storage battery takes the value S3 that is lower than the upper limit threshold S2.

As described above, the control unit 20 performs the charge of the storage battery within the SOC use range (see FIG. 8A) regardless of how large or small the values of the charging currents are (see FIG. 8C), and completes the charge before the negative electrode voltage Va falls below the lithium deposition voltage (0 V) (see FIG. 8B).

Effects

In the electric storage device 2 according to this embodiment, the control unit 20 monitors the SOC of the storage battery during the charge thereof, and completes the charge of the storage battery (END) as soon as the SOC becomes not less than the upper limit threshold S2 corresponding to the lithium deposition voltage (0 V) (Yes in S103). Therefore, the negative electrode voltage Va of the storage battery can be prevented from falling below the lithium deposition voltage, and performance degradation of the storage battery due to the deposition of lithium metal can be avoided.

Moreover, the control unit 20 calculates the charge complete voltage $V2_{fin}$ of the storage battery when the battery voltage CCV of the storage battery during charge has reached the full charge equivalent voltage $V_{ful}$ (S108). Note that, at this point, the negative electrode voltage Va of the storage battery does not fall below the lithium deposition voltage. This is because the SOC: S3 corresponding to the state where the battery voltage CCV has reached the full charge equivalent voltage $V_{ful}$ is less than the SOC: S2 corresponding to the lithium deposition voltage (0 V). Therefore, the control unit 20 can properly set when to calculate the charge complete voltage $V2_{fin}$.

In other words, the control unit 20 calculates the charge complete voltage $V2_{fin}$ before the negative electrode voltage Va of the storage battery falls below the lithium deposition voltage in the charge state. Then, when the battery voltage CCV has reached the charge complete voltage $V2_{fin}$ (Yes in S114: see FIG. 7), the control unit 20 completes the charge by cutting off the electrical connection between the storage battery and the power system 4 (END).

Therefore, even if there is a response delay between input of a signal from the control unit 20 and reflection thereof on the control of the power generation device 1 (e.g., stop of a windmill), the negative electrode voltage of the storage battery can be surely prevented from falling below the lithium deposition voltage.

Moreover, when the charge complete voltage $V2_{fin}$ calculated in S108 in FIG. 6 is not less than the maximum allowable voltage $V_{fin}$ of the storage battery (Yes in S109: see FIG. 7), the control unit 20 replaces the value of the charge complete voltage $V2_{fin}$ with the maximum allowable voltage $V_{fin}$ (S110).

Thus, the negative electrode voltage Va can be surely prevented from falling below the lithium deposition voltage while preventing the occurrence of problems with the storage battery due to the battery voltage CCV exceeding the maximum allowable voltage $V_{fin}$.

Furthermore, the control unit 20 reads the negative electrode voltage Va when the battery voltage CCV has reached the full charge equivalent voltage $V_{ful}$ (S101), and calculates the value of the charge complete voltage $V2_{fin}$ using the no-load characteristics (broken lines in FIGS. 4A and 4B) and the like. Thus, the charge complete voltage $V2_{fin}$ corresponding to the lithium deposition voltage can be accurately calculated.

Comparative Example

In CCCV charge, the current is limited until the SOC reaches its maximum after the battery voltage CCV has reached the full charge equivalent voltage $V_{ful}$, and the charge is performed so as not to exceed the full charge equivalent voltage $V_{ful}$. Therefore, in the CCCV charge, the larger the value of the charging current I, the sooner the battery voltage CCV reaches the full charge equivalent voltage $V_{ful}$. Thus, the charge needs to be performed while limiting the charging current I.

On the other hand, in the technology described in Patent Literature 1, a negative electrode voltage is estimated, and the charge is continued even though the battery voltage CCV exceeds the full charge equivalent voltage $V_{ful}$ (see FIG. 9A) as long as the negative electrode voltage does not fall below 0 V. Note that 0 V shown in FIG. 9B is based on the lithium deposition voltage.

In this case, even when the battery voltage CCV has reached the full charge equivalent voltage $V_{ful}$, the current is not limited in a section where the negative electrode voltage is larger than the lithium deposition voltage (SOC: S5 to S6 in FIG. 9C). Thus, the current limit section becomes shorter than that in the CCCV charge method (SOC: S6 to 100% in FIG. 9C).

Moreover, in the technology described in Patent Literature 1, when the charging current of the storage battery can be instantaneously controlled (e.g., in the case of application to a hybrid vehicle or an electric vehicle), the negative electrode voltage Va can be controlled not to fall below the lithium deposition voltage (0 V). In the hybrid vehicle or electric vehicle, for example, a motor is actuated as a generator during deceleration, and regenerative energy is converted into electric power and collected to charge a storage battery. Moreover, when the SOC of the storage battery is high and the current value needs to be suppressed, deceleration (foot brake) using a brake pedal is performed without regeneration.

As described above, in the hybrid vehicle or electric vehicle, energy allocation using regeneration or the foot brake during deceleration can be controlled by charge and discharge of the storage battery. Moreover, the current can be controlled in a short period of time so as to prevent the negative electrode voltage from falling below a predetermined value.

Meanwhile, in a windmill for wind power generation, for example, generated power is proportional to a wind receiving area of blades of the windmill. Therefore, in this case, the wind receiving area needs to be adjusted by controlling an attachment angle (pitch angle) of the blades according to the SOC of the storage battery. However, in the present circumstances, it takes several sec to several ten sec to change the pitch angle.

Then, when the method described in Patent Literature 1 is applied to absorb excess power of the wind power generation device, charging current control does not make it in time, and the negative electrode voltage may fall below the lithium voltage. In this case, lithium metal might be deposited on the negative electrode side of the storage battery, resulting in performance degradation of the storage battery.

Meanwhile, in the electric storage device 2 according to this embodiment, the charge complete voltage $V2_{fin}$ is calculated before the negative electrode voltage Va falls below the lithium deposition voltage, and the charge is completed by electrically disconnecting the storage battery from the power system 4 when the battery voltage CCV becomes not less than the charge complete voltage $V2_{fin}$.

Therefore, when the storage battery absorbs the excess of the power generated by the wind power generation, for example, the power generated until the rotation of the windmill is actually stopped against inertial force after a stop command is inputted can be prevented from flowing into the storage battery.

More specifically, according to this embodiment, the reliability of the electric storage device 2 can be improved by surely preventing deposition of lithium metal on the negative electrode side of the storage battery regardless of the responsiveness of the power generation device 1. Note that the other storage battery (battery cell 242) electrically connected to the power system 4, among those included in the electric storage device 2, is charged with the excess power described above.

Modified Example

Although the electric storage device 2 according to the present invention has been described in detail above with reference to the drawings, the present invention is not limited to the above embodiment, but appropriate changes can be made without departing from the spirit of the present invention.

For example, in the above embodiment, the description has been given of the case where the SOC calculation section 21a calculates the SOC of the storage battery based on the battery voltage CCV and the charging current I. However, the present invention is not limited thereto, but other methods may be used, such as sequentially integrating the charging currents I, for example. Moreover, in calculation of the SOC, the temperature of the storage battery detected by a temperature sensor (not shown) may also be used.

Moreover, in the above embodiment, the description has been given of the case where the power generation device 1 is the one using natural energy, such as the wind power generation device and the solar power generation device. However, the present invention is not limited thereto, but other kinds of power generation devices may be used.

Moreover, instead of or in addition to the power generation device 1, a load that consumes power may be connected to the power system 4, and power may be supplied to the load from the electric storage device 2. In this case, it is desirable to achieve electric-load leveling by charging the storage battery during the night when the demand-side load is light and discharging from the storage battery during the day when the demand-side load is heavy.

Moreover, in the above embodiment, the upper limit threshold S2 of the SOC is set as the SOC corresponding to the lithium deposition voltage (0 V). However, the present invention is not limited thereto. Specifically, the upper limit threshold S2 may be set to a value smaller than the SOC corresponding to the lithium deposition voltage, thereby making a predetermined allowance.

Moreover, in the above embodiment, the description has been given of the case where the amount of change $\Delta S$ is calculated by subtracting the SOC: S3 corresponding to the full charge equivalent voltage $V_{ful}$ from the SOC: S2 (see FIG. 4B) corresponding to the lithium deposition voltage, and the charge complete voltage $V2_{fin}$ is calculated using the amount of change $\Delta S$. However, the present invention is not limited thereto. For example, the amount of change $\Delta S$ may be multiplied by a predetermined factor k (0<k<1) to obtain $\Delta S2$, and the charge complete voltage $V2_{fin}$ may be calculated based on $\Delta S2$.

Moreover, in the above embodiment, the description has been given of the case where the control unit 20 calculates the charge complete voltage $V2_{fin}$ using the SOC when the battery voltage CCV of the storage battery has reached the full charge equivalent voltage $V_{ful}$. However, the present invention is not limited thereto. Specifically, the charge complete voltage $V2_{fin}$ may be calculated using the SOC when the battery voltage has reached a preset predetermined value. Note that the predetermined value is set within the SOC use range.

Moreover, it is preferable that the control unit 20 includes "charge complete voltage correction means" for reducing the charge complete voltage $V2_{fin}$ when the charging current average value is increased by a predetermined amount or more within a predetermined period of time (first correction processing). Note that the values of the predetermined amount and predetermined period of time described above are preset and stored in the storage means.

Moreover, the charge complete voltage correction means may increase the charge complete voltage $V2_{fin}$ when the charging current average value is reduced by the predetermined amount or more within the predetermined period of time (second correction processing).

Note that the charge complete voltage correction means may execute both of or either one of the first correction processing and the second correction processing.

Thus, the value of the charge complete voltage $V2_{fin}$ can be appropriately set considering a voltage drop within the storage battery due to an increase in the charging current I (voltage drop due to the internal resistance R).

Figure 7:
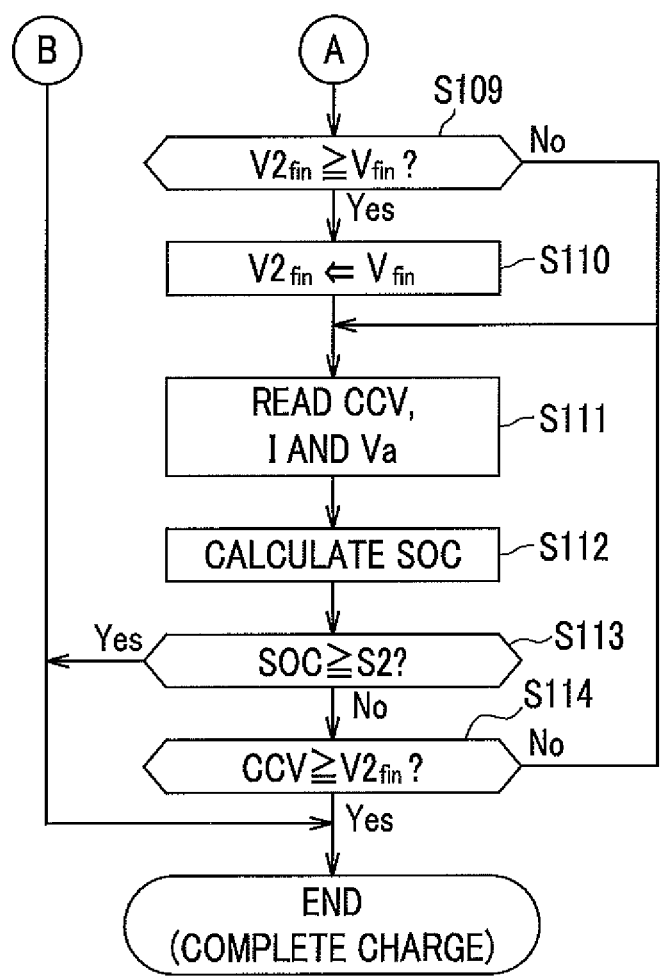
FIG. 7 is a flowchart showing the flow of processing executed by the control unit.

Moreover, the processing in Steps S109 and S110 shown in FIG. 7 in the above embodiment may be omitted. In this case, again, the deposition of lithium metal on the negative electrode side of the storage battery can be prevented by completing the charge when the battery voltage CCV of the storage battery has reached the charge complete voltage $V2_{fin}$.

DESCRIPTION OF REFERENCE SYMBOLS

S: electric power system
1: power generation device
2: electric storage device
20: control unit
21: charge complete voltage calculation means
21a: SOC calculation section
21b: voltage difference calculation section
21c: adder
22: storage means
23: charge control means
210: system control unit
220: battery block (electric storage device)
221: integrated control unit
230: battery pack (electric storage device)
231: battery control unit
240: battery module (electric storage device)
241: battery cell monitoring unit
242: battery cell (lithium ion storage battery)
3: bidirectional inverter
4: power system

The invention claimed is:

1. An electric storage device comprising:
SOC calculation section for calculating, in the case where a battery voltage of a lithium ion storage battery during charge has reached a predetermined value, a charge rate of a lithium ion storage battery when the battery voltage has reached the predetermined value;
voltage difference calculation section for calculating, based on no-load characteristics of the lithium ion storage battery, a battery voltage difference corresponding to a difference between the charge rate calculated by the SOC calculation section and a preset charge rate during lithium deposition;
charge complete voltage calculation section for calculating a charge complete voltage that is a criterion for determining whether or not to complete the charge, by adding the battery voltage difference calculated by the voltage difference calculation section to the battery voltage when the battery voltage has reached the predetermined value; and
charge control section for completing the charge of the lithium ion storage battery when the battery voltage of the lithium ion storage battery has reached the charge complete voltage;
wherein the charge complete voltage calculation section resets a maximum allowable voltage as a new charge complete voltage when the charge complete voltage calculated based on the battery voltage difference calculated by the voltage difference calculation section is higher than the maximum allowable voltage preset according to specifications of the lithium ion storage battery, and the charge control section completes the charge of the lithium ion storage battery when the battery voltage of the lithium ion storage battery has reached the reset new charge complete voltage.

2. The electric storage device according to claim 1, wherein the SOC calculation section calculates the charge rate of the lithium ion storage battery based on a charging current average value that is a value obtained by averaging, every predetermined period of time, charging currents of the lithium ion storage battery detected by a battery cell monitoring unit, and also based on a battery voltage of the lithium ion storage battery detected by the battery cell monitoring unit.

3. The electric storage device according to claim 2, wherein the charge control section executes at least one of
first correction processing of reducing the charge complete voltage when the charging current average value is increased by a predetermined amount or more within a predetermined period of time, and
second correction processing of increasing the charge complete voltage when the charging current average value is reduced by a predetermined amount or more within a predetermined period of time.

4. The electric storage device according to claim 1, wherein the SOC calculation section calculates, in the case where the battery voltage during charge of the lithium ion storage battery has reached a full charge equivalent voltage equivalent to a full charge voltage of the lithium ion storage battery in a no-load state, a charge rate of the lithium ion storage battery when the battery voltage has reached the full charge equivalent voltage, and outputs the charge rate to the voltage difference calculation section.

5. A charging method comprising:
charge rate calculation processing by an SOC calculation section of calculating, in the case where a battery voltage of a lithium ion storage battery during charge has reached a predetermined value, a charge rate of the lithium ion storage battery when the battery voltage has reached the predetermined value;
voltage difference calculation processing of calculating, based on no-load characteristics of the lithium ion storage battery, a battery voltage difference corresponding to a difference between the charge rate calculated by the SOC calculation section and a preset charge rate during lithium deposition;
charge complete voltage calculation processing of calculating a charge complete voltage that is a criterion for determining whether or not to complete the charge, by adding the battery voltage difference to the battery voltage when the battery voltage has reached the predetermined value; and
charge control processing of completing the charge of the lithium ion storage battery when the battery voltage of the lithium ion storage battery has reached the charge complete voltage;
wherein the charge complete voltage calculation processing resets a maximum allowable voltage as a new charge complete voltage when the charge complete voltage calculated based on the battery voltage difference calculated by the voltage difference calculation processing is higher than the maximum allowable voltage preset according to specifications of the lithium ion storage battery, and the charge control processing completes the charge of the lithium ion storage battery when the battery voltage of the lithium ion storage battery has reached the reset new charge complete voltage.

* * * * *